Nov. 7, 1961  J. G. EENINK  3,007,751
LUBRICATOR
Filed June 16, 1958

Johannes G. Eenink
INVENTOR.

BY Ray L. Smith

ATTORNEY

United States Patent Office 3,007,751
Patented Nov. 7, 1961

3,007,751
LUBRICATOR
Johannes G. Eenink, Houston, Tex., assignor to Hughes Tool Company, Houston, Tex., a corporation of Delaware
Filed June 16, 1958, Ser. No. 742,281
2 Claims. (Cl. 308—187)

This invention relates to the lubrication of relatively rotatable parts and is of particular utility in maintaining thorough lubrication of parts where there is a combination of relative axial, radial and wobbling movement between the parts.

The invention is of particular utility in earth boring drills of the rolling cutter type and is described herein as embodied in such a structure. However, it is to be understood that the invention is not confined to such specific structure, but is of utility in any environment wherein advantage may be had of its superiority in maintaining adequate lubrication of relatively rotatable parts. In earth boring drills conditions are extremely severe because such drills operate in an ambient of abrasive fluid wherein there is possibility not only of loss of lubricant but a replacement, in quantity for such loss, of an abrasive fluid which contaminates the remaining lubricant and renders the bearing fluid of a destructive nature rather than a body of protective lubricant.

The primary object of the invention is to provide a lubrication system that will assure the presence of adequate, uncontaminated lubricant in a bearing at all times.

Another object is to provide a sealed bearing assembly including a complement of lubricant so that replacement of lost lubricant may be effected and compensation is made for any volumetric change within the bearing during relative movements between parts thereof.

Still another object is to provide a sealed bearing assembly including a lubricant chamber and means for maintaining in the bearing at all times the proper volume of lubricant, even though relatively large and rapidly changing volumetric changes take place within the bearing.

A still further object is to provide a bearing assembly with a lubricant chamber containing a quantity of lubricant and a sheath or stall forming an impermeable barrier between the lubricant and fluids exteriorly of the chamber to compensate for volumetric changes which take place within the bearing.

These and other objects will be apparent from the following description and the accompanying drawings in which.

Figure 1:
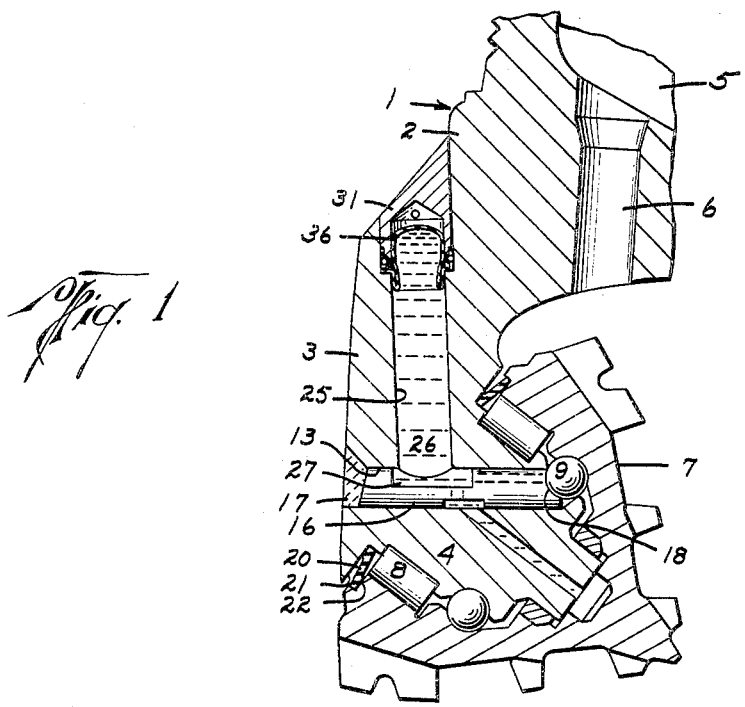
FIG. 1 is a sectional view through one of the cutter assemblies of a cone type bit embodying the invention.
Figure 2:
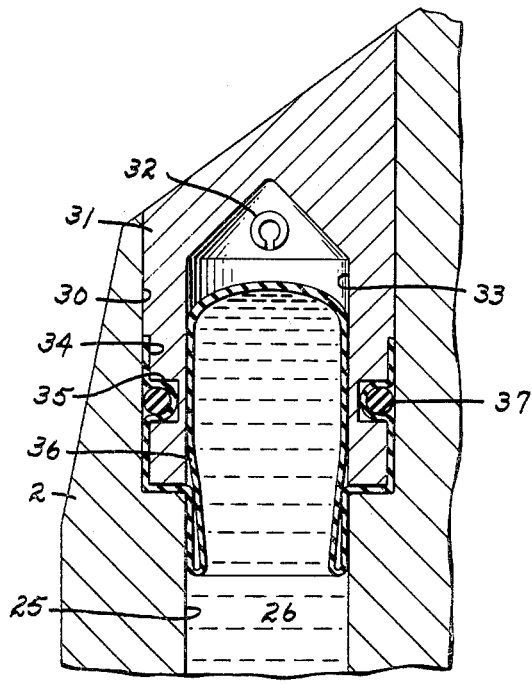
FIG. 2 is an enlarged sectional view through the upper end of the lubricant chamber showing the sheath closing the end of the chamber.

The bit 1 comprises a bit head 2 having downwardly extending legs, one of which is shown at 3. Each leg has an integral shaft 4 which extends inwardly and downwardly toward the axis of the bit. The head 2 has an internal chamber 5 through which flushing fluid is conducted downwardly through passageways 6 to and about the cutters, one of which is shown at 7.

A bore 13 extends from the exterior of the leg 3 to a point in the ball race for the ball bearings 9. The structure thus enables positioning of the cutter 7 upon the shaft 4 with the rollers 8 in place. The balls 9 are inserted through the bore 13 until the ball raceway is filled. A pin 16 is then inserted in the bore 13 and secured in place as by means of weld metal 17. It is noted that the inner end of the pin 16 is contoured at 18 to complete the ball race where the bore 13 enters the ball race.

An annular frusto conical seal ring 20 forms a seal between the surface 22 at the base of the cutter 7 and the shoulder 21 at the base of the shaft 4. There is thus provided a sealed bearing in which it is desired to keep an adequate supply of lubricant and from which contaminants are to be excluded. This requires that pressures on opposite sides of the seal ring be substantially balanced at all times, that flushing fluids exteriorly of the bearing be prevented from entering the bearing and that compensation be made for any lubricant leaking past the seal ring.

To accomplish this a chamber 25 is provided in the bit leg 3, and this chamber as well as the entire bearing is filled with a body of lubricant 26.

The bore forming the chamber 25 is counterbored at its upper end at 30 to receive a plug 31 which is secured in place by a drive pin 32 which also serves as a breather opening between the interior bore 33 in the plug and the exterior of the bit head 2.

The plug 31 is reduced exteriorly at its lower end at 34 and a peripheral groove 35 is formed in this reduced portion. The space provided between the plug 31 and the surrounding wall of the counterbore 30 receives the end of a sheath or stall 36 of impervious, flexible material such as rubber, or any suitable synthetic plastic material currently available. After the end of the sheath 36 is placed upon the lower end of the plug an elastic ring 37 is placed thereon and deforms the wall of the sheath into the groove 35 so that the sheath is held in place and a seal is formed between the chamber 25 and the exterior of the bit head 2. When the plug 31 is installed, there is adequate lubricant in the chamber 25 so that the sheath 36 assumes the configuration shown and forms a flexible barrier between the lubricant 26 and the space in the upper portion of the bore 33 therein.

The lower end of the chamber 25 communicates with a cut away portion 27 of the pin 16, the pin being further contoured or drilled to provide fluid passageways to selected points within the bearing. The features of construction just described thus enable ebb and flow of lubricant throughout the bearing, and to and from the chamber 25, upon any movement of the cutter 7 relative to the shaft 4 giving rise to a volumetric change within the bearing.

In order to explain the operation of the invention, it is pointed out that earth boring bits are subjected to extreme stresses. Heavy static loads are applied, and these are augmented by impact stresses of high amplitude. As previously explained, lubricating problems are further complicated by the presence of abrasive fluids about the bit.

The extreme stress conditions and the varying directions of resultant forces cause a complex movement of the cutter 7 relative to the shaft 4 and such movement is amplified as wear takes place. One component of movement is axially of the shaft, there may be eccentric movement relative to the axis of the shaft, and at the same time the cutter 7 wobbles relative to the shaft 4. Resultant movements cause volumetric changes within the bearing, and such changes may take place at a very high rate both as to sequence and rate of change.

The sheath or stall 36 is of small mass and is flexible. Hence it is capable of movement with every fluctuation of lubricant 26 in the chamber 25. For this reason compensation is had for any volumetric change within the bearing structure, no differential pressure develops across the seal ring 21 and ingress of contaminating fluid to the lubricant is prevented.

Furthermore, in the event lubricant is lost, replacement is obtained from the body of lubricant 26, the sheath 36 will flex downwardly as such replacement takes place and contamination of the lubricant within the structure is avoided.

While the description of the disclosed embodiment refers to the extreme conditions encountered in an earth boring drill, other bearing structures are subjected to comparable conditions and the invention is equally applicable thereto.

Broadly the invention comprehends a bearing lubrication system which is so constructed and arranged that adequate uncontaminated lubricant is maintained in a bearing at all times.

The invention claimed is:

1. In a bearing assembly comprising two relatively rotatable members having a bearing mounted therebetween and the members are mounted to rotate one upon the other, a seal between said members, a lubricant chamber having a body of lubricant therein, there being a passage communicating between one end of said chamber and the bearing between said members, a hollow plug closing the other end of said chamber, and an elongated sheath of impermeable, flexible material closed at one end and having its opposite end sealably closing the other end of said chamber and extendable into said plug.

2. A bearing assembly comprising two relatively rotatable members having a bearing mounted therebetween and the members are mounted to rotate one upon the other, a seal between said members, one of said members comprising a body having a lubricant chamber therein communicating with the bearing between said members, a hollow plug secured to said body and forming a closure for said chamber, and an elongated sheath of impermeable, flexible material closed at one end and having its opposite end forming a seal between the plug and body and enclosing the end of the chamber so that lubricant within the chamber is freely movable to compensate for volumetric changes in the bearing.

References Cited in the file of this patent

UNITED STATES PATENTS

| | | |
|---|---|---|
| 1,909,128 | Scott et al. | May 16, 1933 |
| 2,676,073 | Boden | Apr. 20, 1954 |

FOREIGN PATENTS

| | | |
|---|---|---|
| 324,601 | Great Britain | Jan. 30, 1930 |
| 855,654 | France | Feb. 19, 1940 |